United States Patent
Saito (10) Patent No.: US 8,001,296 B2
(45) Date of Patent: Aug. 16, 2011

(54) USB CONTROLLER AND BUFFER MEMORY CONTROL METHOD

(75) Inventor: Shinya Saito, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 202 days.

(21) Appl. No.: 12/403,154

(22) Filed: Mar. 12, 2009

(65) Prior Publication Data

US 2009/0240851 A1 Sep. 24, 2009

(30) Foreign Application Priority Data

Mar. 19, 2008 (JP) ................................ 2008-071436

(51) Int. Cl.
*G06F 3/00* (2006.01)
*G06F 5/00* (2006.01)
(52) U.S. Cl. .......................................... 710/56; 711/170
(58) Field of Classification Search .................. None
See application file for complete search history.

(56) References Cited

U.S. PATENT DOCUMENTS

| | | | |
|---|---|---|---|
| 6,185,641 B1* | 2/2001 | Dunnihoo | 710/56 |
| 6,205,517 B1* | 3/2001 | Sugaya | 711/117 |
| 6,219,797 B1* | 4/2001 | Liu et al. | 713/500 |
| 6,581,148 B1* | 6/2003 | Sadashivaiah et al. | 711/170 |
| 6,691,234 B1* | 2/2004 | Huff | 713/300 |
| 7,161,701 B2* | 1/2007 | Ogiwara et al. | 358/1.15 |
| 2001/0056513 A1* | 12/2001 | Ueda | 710/100 |
| 2004/0030742 A1* | 2/2004 | Kitagawa | 709/203 |
| 2005/0005039 A1* | 1/2005 | Saito | 710/52 |
| 2006/0106962 A1* | 5/2006 | Woodbridge et al. | 710/106 |

FOREIGN PATENT DOCUMENTS

JP 2004-349836 A 12/2004

* cited by examiner

*Primary Examiner* — Henry W Tsai
*Assistant Examiner* — Elias Mamo
(74) *Attorney, Agent, or Firm* — Sughrue Mion, PLLC (57) ABSTRACT

A USB controller according to one aspect of the present invention is a USB controller incorporated in a USB device, the USB controller including a RAM that stores data transferred through a USB port or a CPU bus, and a register that holds a setting for determining to which one of a region for host used for a host function and a region for peripheral used for a peripheral function a part of the RAM is allocated.

10 Claims, 5 Drawing Sheets

Fig. 5

USB CONTROLLER AND BUFFER MEMORY CONTROL METHOD

BACKGROUND

1. Field of the Invention

The present invention relates to a USB controller and a buffer memory control method.

2. Description of Related Art

In recent years, a device (hereinafter referred to as USB device) in which a USB (Universal Serial Bus) is mounted has been broadly used. The USB device includes a personal computer, a printer, a digital camera, and a USB memory, for example. The USB device is connected to another USB device through a USB interface for performing data transfer complied with the USB standard. In the data transfer performed in the USB, one device functions as a host (personal computer or the like, for example) and the other device functions as a peripheral (peripheral device such as USB memory or the like). The data transferred between devices is temporarily stored in a buffer memory provided in a USB controller.

In the USB controller applied to an embedded device, a pipe region is allocated to a buffer memory, and the memory size of this pipe region varies according to the connected USB device, for example. Japanese Unexamined Patent Application Publication No. 2004-349836 (patent document 1) discloses a device which enables to change the divided blocks allocated by the pipe region. In a data transfer control device disclosed in the patent document 1, the buffer controller changes the address of the divided blocks provided in the packet buffer to the address corresponding to the allocation of the pipe region.

SUMMARY

Further, the patent document 1 discloses that a peripheral device which has been connected to a host device is provided with a host function (paragraph 0005). This enables to connect the peripheral devices through the USB. Thus, according to the patent document 1, the host controller and the peripheral controller are exclusively switched (paragraph 0047). Accordingly, in the device disclosed in the patent document 1, the host function and the peripheral function cannot be used concurrently.

In USB devices, one of the host function and the peripheral function is used, or both of them are used. To be more specific, there are three types of USB devices: (1) USB device that only uses the host function (USB host device), (2) USB device that only uses the peripheral function (USB peripheral device), and (3) USB device that concurrently uses the host function and the peripheral function (combination device). In summary, it is determined whether the USB device functions as a host, as a peripheral, or as both of them according to the type of the USB device. For example, a PC functions as a host device, a USB memory as a peripheral device, and a printer as a combination device.

Designing and manufacturing an integrated circuit (LSI) for USB controller according to the type of the USB device causes increase in cost. Accordingly, a USB controller that includes both of the host controller and the peripheral controller and can concurrently use both of the host function and the peripheral function has been desired.

In manufacturing such a USB controller, there is a need to provide a buffer memory for each of the host controller and the peripheral controller. By providing the buffer memory for each of them, the buffer memory may not be used with high efficiency. In summary, when a USB controller provided with the buffer memory for host and the buffer memory for peripheral is incorporated in the USB host device, the buffer memory for peripheral cannot be used. On the other hand, when incorporating the USB controller in the USB peripheral device, the buffer memory for host cannot be used. It is switched whether the buffer is used for a host or for a peripheral according to the connection status. As such, the buffer memory cannot be used with high efficiency in the USB device in which the host function and the peripheral function can be concurrently used.

A first exemplary aspect of an embodiment of the present invention is a USB controller incorporated in a USB device, the USB controller including a buffer memory that stores data transferred through a USB port or a CPU bus, and a holding part that holds a setting for determining to which one of a region for host used for a host function and a region for peripheral used for a peripheral function a part of the buffer memory is allocated. Accordingly, the allocation of the buffer memory can be changed according to the USB device. As such, the buffer memory can be used with high efficiency.

A second exemplary aspect of an embodiment of the present invention is a buffer memory control method controlling a buffer memory provided in a USB controller incorporated in a USB device, the method including holding a setting for allocating the buffer memory according to the USB device incorporating the controller and allocating a part of the buffer memory to one of a region for host used for a host function and a region for peripheral used for a peripheral function according to the setting. Accordingly, the allocation of the buffer memory can be changed according to the USB device. As such, the buffer memory can be used with high efficiency.

According to the present invention, it is possible to provide a USB controller that enables to use a buffer memory with high efficiency, and a buffer memory control method.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

The exemplary embodiment to which the present invention can be applied will now be described. The following description will be made for the purpose of explaining the exemplary embodiment of the present invention, and the present invention is not limited to the exemplary embodiment below. Some parts of the description below are omitted and simplified as appropriate for the sake of clarity. A person skilled in the art would be able to readily change, add, or modify each element of the exemplary embodiment below without departing from the spirit of the present invention. The same reference symbols are assigned to the same components throughout the drawings, and the description thereof will be omitted as appropriate.

A USB controller according to this invention is incorporated in a USB device. The USB controller has a buffer memory. The buffer memory stores data transferred through a USB port or a CPU bus. Furthermore, the USB Controller includes a holding part. The holding part holds a setting for determining to which one of a region for host used for a host function and a region for peripheral used for a peripheral function a part of the buffer memory is allocated.

USB is applied to various devices. For example, USB is mounted in various devices as a PDA (Personal Digital Assistant), a copier, a digital camera, a printer, a USB memory, a personal computer (PC), a digital appliance, a digital television, a digital recorder, and so on. The USB interface can be thus provided, and the data communication complied with the USB standard is performed. Such a USB device includes a USB controller that controls the data communication.

It is determined whether the USB device functions as a USB host device, as a USB peripheral device, or as a combination device (device that concurrently uses host and peripheral functions) according to the function or application. The term "concurrently" here is not limited to the exact concurrence but means a state in which one or more USB port(s) is (are) used for a host function while other USB ports are used for a peripheral function in one USB device, and vice versa. For example, a printer or the like is a combination device that concurrently uses a host function and a peripheral function. For example, the printer functions as a peripheral when connected to the PC, and functions as a host when connecting a digital camera to another port. In summary, in a state in which the PC and the digital camera are concurrently connected to the printer, the host function and the peripheral function are concurrently operated. Thus, the USB port of the printer is used for the host function or the peripheral function. On the other hand, the USB memory functions as a USB peripheral device, and the PC functions as a USB host device. This means that the USB memory only functions as a USB peripheral device, and the PC only functions as a USB host device.

A buffer memory is set by a user of the USB controller, for example, a manufacturer manufacturing the USB device according to the type of the USB device. When the user of the USB controller mounts an integrated circuit for USB in the USB device, the allocation of the buffer memory is set. For example, a part of the buffer memory is set as a region which can be used for both host and peripheral functions. In a case of the combination device, a part of the buffer memory is allocated to the region for peripheral, and the rest of the buffer memory is allocated to the region for host. On the other hand, in a case of the USB host device, the whole region is allocated to the region for host. As such, the setting of allocation of the buffer memory is changed according to the USB device. Accordingly, the buffer memory can be used with high efficiency. In summary, as the memory region with appropriate size is allocated to the peripheral function and the host function, the data writing and reading can be performed with high speed.

Figure 1:
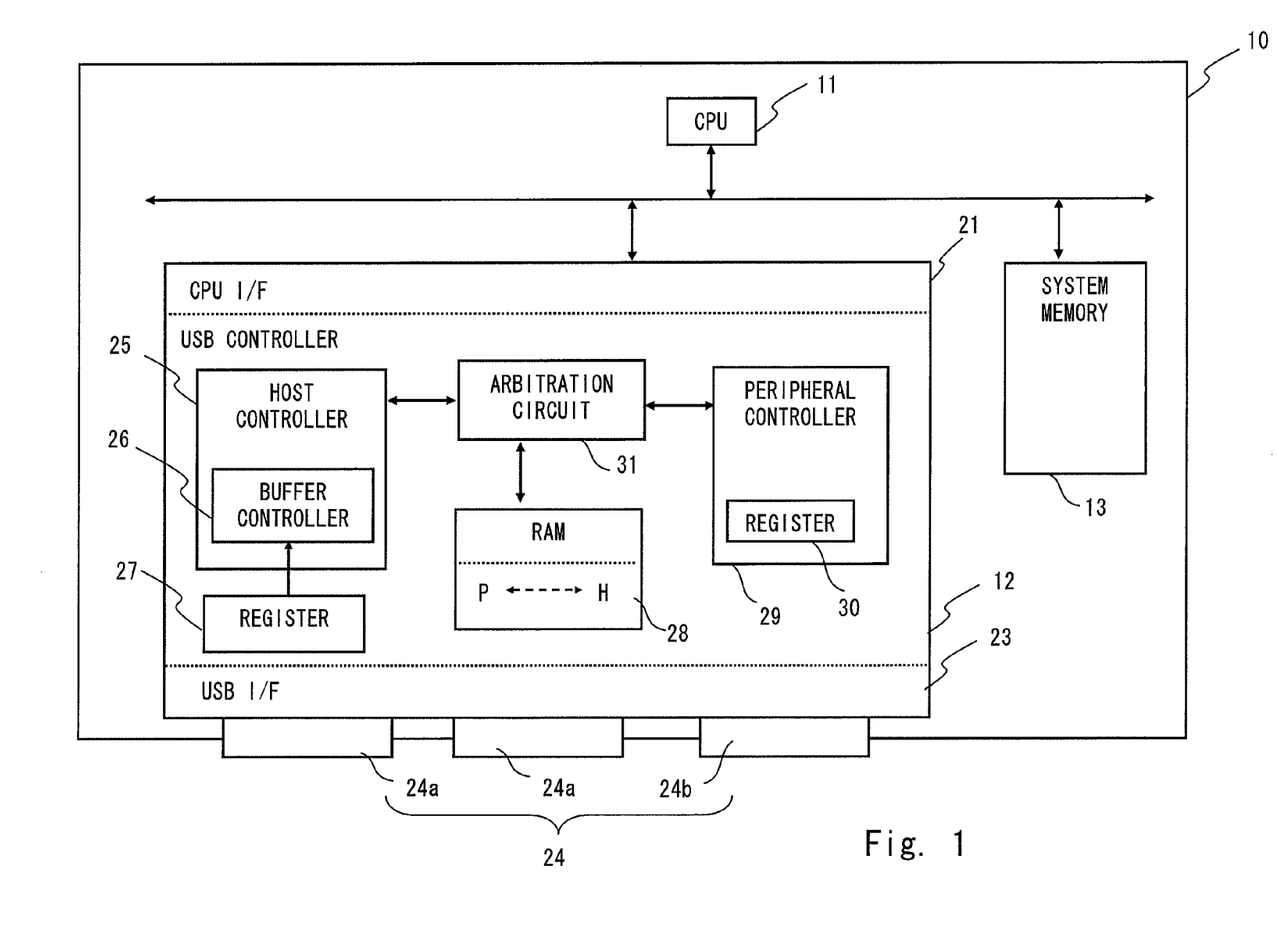
FIG. 1 is a block diagram showing the configuration of a USB device according to an exemplary embodiment of the present invention.

An LSI (Large Scale Integrated circuit) for USB according to the exemplary embodiment of the present invention will be described with reference to FIG. 1. FIG. 1 is a block diagram schematically showing the configuration of a USB device. A USB device 10 includes a CPU (Central Processing Unit) 11, a USB controller 12, and a system memory 13. All of them are connected through a bus line. The USB controller 12 performs data communication complied with the USB standard. Note that the USB controller 12, the CPU 11, and the system memory 13 may be integrated in the LSI. Needless to say, the USB controller 12, the CPU 11, and the system memory 13 may be separated into different chips.

The CPU 11 controls the whole operation of the USB device 10. The system memory 13 stores programs and set values that are required for control. For example, the CPU 11 reads out the program or the set value of the system memory 13 to control the USB controller 12. Further, the USB controller 12 is a USB control circuit which provides interface for the USB host or the USB peripheral. Thus, the connection with another USB device can be made possible.

Next, the configuration of the USB controller 12 will be described. The USB controller 12 includes a CPU I/F (interface) 21, a USB I/F 23, a USB port 24, a host controller 25, a buffer controller 26, a register 27, a RAM 28, and a peripheral controller 29.

The CPU I/F 21 is an interface for transmitting/receiving data to/from the CPU 11. Thus, the USB controller 12 is connected to the CPU 11 through the CPU I/F 21. As such, the CPU 11 controls the USB controller 12.

The USB I/F 23 provides the USB port 24 for performing connection with another USB device. A USB device or a USB cable is connected to the USB port 24. More specifically, the data communication can be made by inserting the USB device or the USB cable into the USB port 24. In FIG. 1, three USB ports 24 are provided in the USB I/F 23. Two of the three USB ports 24 are denoted by USB port 24a, and the remaining one is denoted by USB port 24b. The USB port 24a is a host-dedicated port, and the USB port 24b is a port that can switch host and peripheral. Note that the number of ports of the USB device 10 is not limited to three, but may be one, two, four or more. The USB port 24 is set according to the USB device 10 incorporating the USB controller 12. The data communication may be performed by a wireless USB as well.

The host controller 25 controls the data communication by the host function. In other words, when a USB peripheral device is connected to the USB port 24, the USB device 10 functions as the host. When a peripheral device is connected to the USB port 24, the host controller 25 controls the data communication on the USB bus. Accordingly, the USB device 10 functions as the host.

The RAM 28 is a buffer memory storing the data of the USB communication. The RAM 28 temporarily stores the data transferred from another USB device. Further, the RAM 28 temporarily stores the data that is to be transferred to another USB device.

The RAM 28 which is the buffer memory is divided into any desired size. Each divided region is called block. A block number is allocated to each block of any desired size in advance. The block number is fixed. The buffer controller 26 manages the access destination to the RAM 28 based on the information such as the size of the pipe region and the block number, and the RAM 28 is managed as a chain. In summary, the specific block number given to each block is the address, which is used for the chain management. More specifically, the block number and the link destination block number are stored in a chain address storage buffer while being made correspondent to each other. The RAM 28 stores the data transferred through the USB port 24 or the CPU bus.

The peripheral controller 29 controls the data communication by the peripheral function. More specifically, when a USB host device is connected to the USB port 24, the USB device 10 to which the USB controller 12 is incorporated functions as the peripheral. When the host device is connected to the USB port 24, the peripheral controller 29 controls the data communication. Thus, the USB device 10 to which the USB controller 12 is incorporated functions as the peripheral. Further, a register 30 is provided in the peripheral controller 29. The register 30 will be described below.

An arbitration circuit 31 prevents the host controller 25 and the peripheral controller 29 from accessing the RAM 28 at the same time. For example, when the host controller 25 accesses the RAM 28, the arbitration circuit 31 prohibits the access by the peripheral controller 29 to the RAM 28. When the peripheral controller 29 accesses the RAM 28, the arbitration circuit 31 prohibits the access by the host controller 25 to the RAM 28. As such, even with the combination device that concurrently uses the host function and the peripheral function, the host controller 25 and the peripheral controller 29 can be prevented from accessing the RAM 28 at the same time.

As stated above, the USB controller 12 is provided with the host controller 25 and the peripheral controller 29. Thus, the USB controller 12 can be incorporated to any one of (1) USB device that only uses the host function (USB host device), (2) USB device that only uses the peripheral function (USB peripheral device), and (3) USB device that concurrently uses the host function and the peripheral function (combination device).

The host controller 25 is provided with the buffer controller 26. The buffer controller 26 controls the RAM 28 which is the buffer memory. For example, the buffer controller 26 stores a block number that is used for managing the RAM 28 by a chain. Furthermore, the buffer controller 26 stores the setting needed for the chain management. For example, the buffer controller 26 has the chain address storage buffer. The buffer controller 26 stores the block number and the link destination block number while being made correspondent to each other.

The USB controller 12 is further provided with the register 27. The register 27 holds the setting for determining to which one of the region for host and the region for peripheral a part of the RAM 28 is allocated. In summary, the register 27 is the holding part for holding the setting to determine the controller which is to be allocated. According to the value held in the register 27, a part of the region of the RAM 28 functions as the region for host or the region for peripheral. The host controller 25 uses the region for host and the peripheral controller 29 uses the region for peripheral. In other words, the peripheral controller 29 cannot use the region for host, and the host controller 25 cannot use the region for peripheral. According to the setting in the register 27, a part of the block included in the RAM 28 is allocated to one of the region for host and the region for peripheral. More specifically, when the value of the register 27 is 1, a part of the RAM 28 is allocated to the region for peripheral. On the other hand, when the value of the register 27 is 0, the whole region of the RAM 28 is allocated to the region for host.

The setting of the register 27 is performed by the CPU 11, software or the like. For example, the CPU 11 sets the register 27, and the setting of the region is stored in the register 27 accordingly. More specifically, the user of the USB controller 12 (a manufacturer manufacturing the USB device, for example) performs the setting of the register 27 when incorporating the USB controller 12 in the USB device 10. More specifically, it is set in the register 27 of the USB controller 12 in which controller of the host controller 25 and the peripheral controller 29 the USB port 24 is used. According to this setting, it is determined to which of the region for host and the region for peripheral the part of the RAM 28 is to be allocated. Note that the method of setting the register 27 is not specifically limited.

Figure 2:
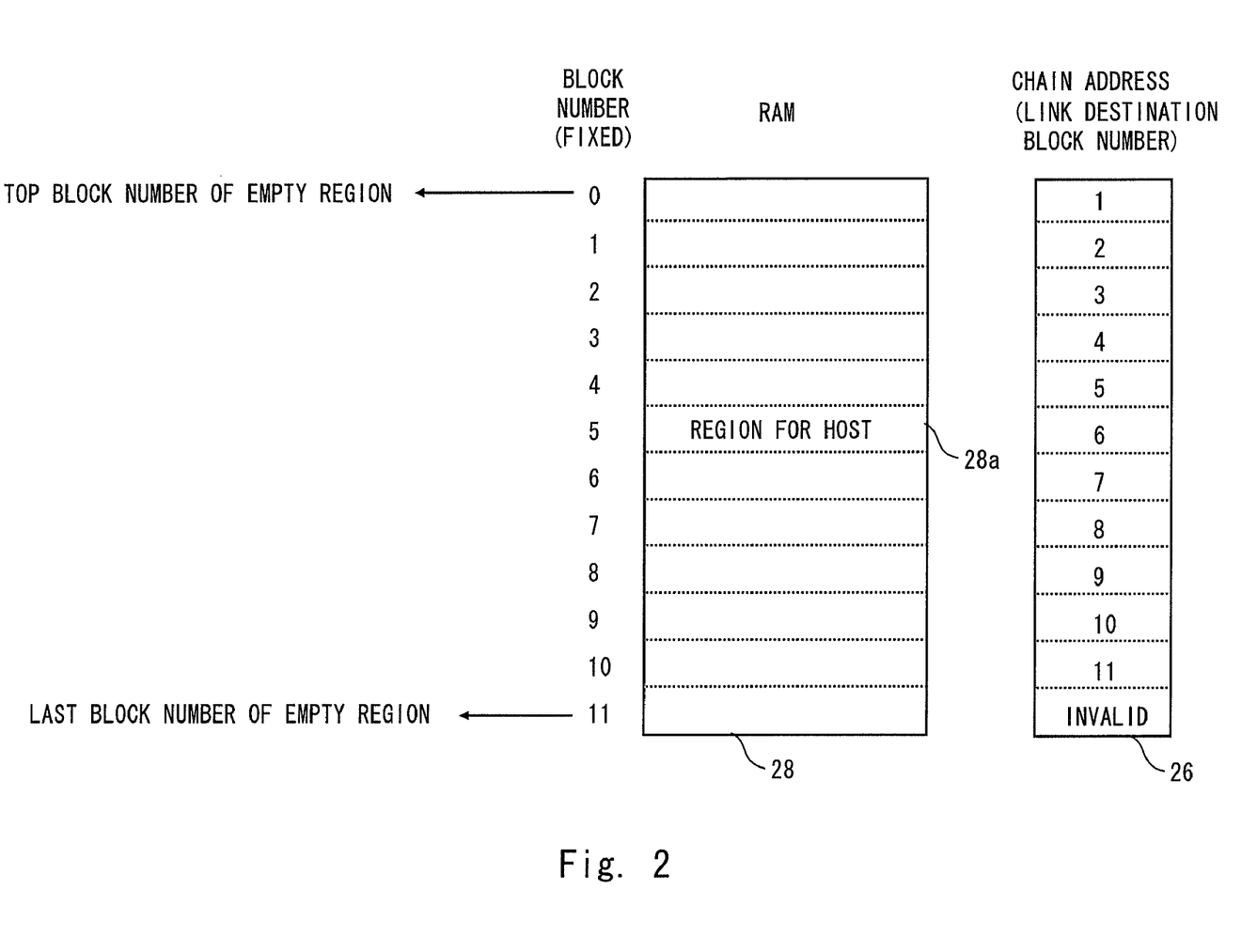
FIG. 2 shows a mapping state of a memory in the USB device according to the exemplary embodiment of the present invention.
Figure 3:
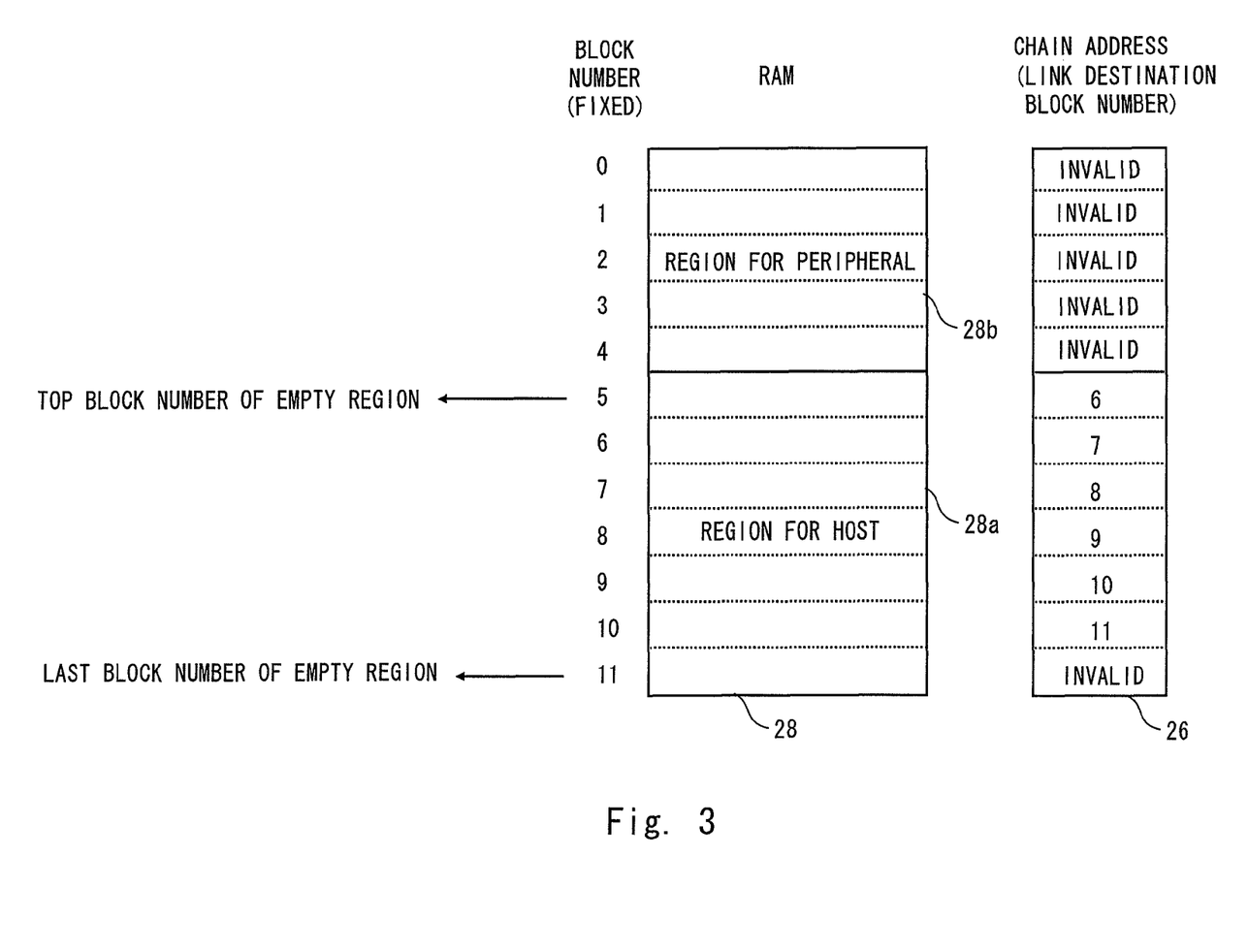
FIG. 3 shows a mapping state of a memory in the USB device according to the exemplary embodiment of the present invention.
Figure 4:
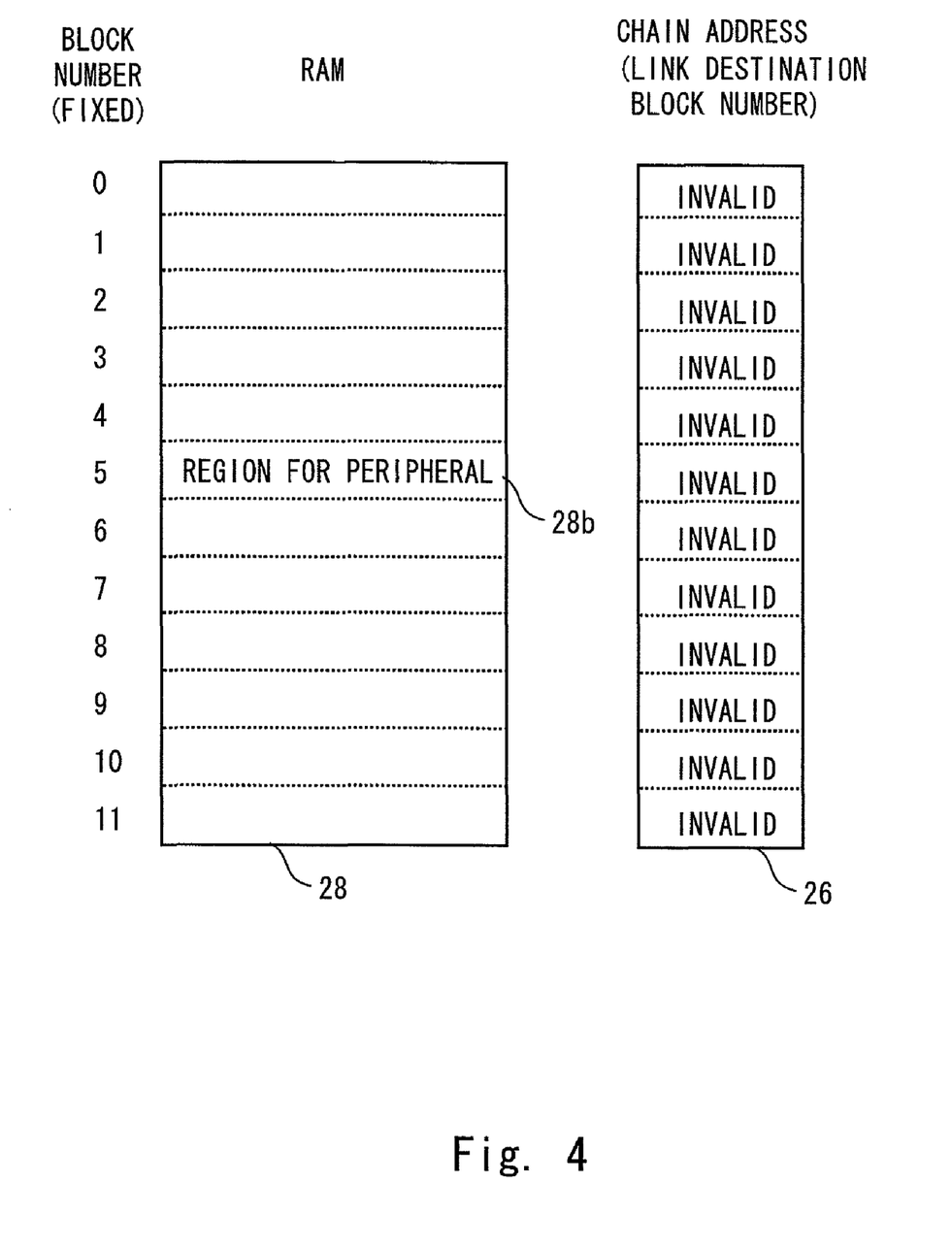
FIG. 4 shows a mapping state of a memory in the USB device according to the exemplary embodiment of the present invention.

Next, the allocation of the RAM 28 will be described with reference to FIGS. 2 to 4. FIGS. 2 to 4 show a mapping state of the RAM 28. In FIGS. 2 to 4, the RAM 28 is assumed to be divided into 12 parts. There are blocks from block number 0 to block number 11 in the RAM 28. Needless to say, the number of division of the RAM 28 is not specifically limited.

FIG. 2 shows a case in which all the blocks included in the RAM 28 are used for the host function, which means the whole part of the RAM 28 is the region for host 28a. As shown in FIG. 2, the bit indicating the block number is made correspondent to the link destination block number. The chain address is thus stored. The blocks of the RAM 28 are managed as a chain by this chain address. In other words, after the data is written in the link source block, then the data is written in the link destination block. As such, the blocks are successively used according to the link destination block number.

In the example of FIG. 2, all the blocks are empty region. Accordingly, the top block of the empty region is the block of block number 0, and the last block is the block of block number 11. In summary, the top block number of the empty region is 0, and the last block number is 11. As such, the blocks are successively used from the block 0 to the block 11. The link destination address of the block number 0 is the block number 1, and the link destination address of the block number 1 is the block number 2. Similarly, the next block number is held as a link destination block number for other blocks as well. Further, in the block number 11 which is the last block, the flag indicates that the next block number is Invalid (Invalid flag). For example, the Invalid flag is used as a flag indicating the last of the chain. The Invalid flag plays a role of separating the pipe region chains or the pipe region chain and the empty region chain. The chain address is thus stored in the chain address storage buffer.

Further, when the RAM 28 is used for the host function, the pipe region is secured when communication is performed with the peripheral device. The pipe region may be secured by software or by hardware. The pipe region is where the transfer data is temporarily stored for the communication of the USB host with the USB peripheral (end point). When the pipe region is allocated, a part of the blocks of the RAM 28 is allocated to the pipe region. The buffer controller 26 stores, for example, the top block and the last block of the empty region. The blocks are successively allocated to the pipe region from the top block of the empty region, and the last block of each pipe region is made Invalid. Further, the top block number of each pipe region is stored. By changing the link destination block number as above, the secure of the pipe region can be easily managed. Further, when the pipe region is opened, the link destination block number of the last block of the empty region is made the top block of the pipe region that is to be opened. By changing the link destination block number as above, the opening of the pipe region can be readily managed. Thus, the management of each block included in the region for host 28a can easily be made.

Next, a case in which a part of the RAM 28 is used for the host function and remaining part is used for the peripheral function will be described with reference to FIG. 3. In FIG. 3, the blocks 0 to 4 are allocated to the peripheral function, and the blocks 5 to 11 are allocated to the host function. In summary, the blocks 0 to 4 function as the region for peripheral 28b, and the blocks 5 to 11 function as the region for host 28a.

The blocks 5 to 11 included in the region for host 28a are managed as the chain as is similar to FIG. 2. In short, the block 5 is the top block of the empty region, and the block 11 is the last block of the empty region. Then, regarding the blocks 5 to 10, the link destination block number is the next block number. Further, regarding the block 11, which is the last block of the region for host 28a, the link destination block number is Invalid. When the pipe region is allocated to the empty region, the link destination block number is changed as in the same way as above.

In the blocks 0 to 4 included in the region for peripheral 28b, all the link destination block numbers are Invalid. In other words, the region for peripheral 28b is not managed as the chain, and therefore, the chain of the chain management is cut off. In the region for peripheral 28b, the register 30 for designating the region used by each end point is mounted in the peripheral controller 29 and set by software. Then, according to this setting, the buffer region which is used by each end point in USB data communication is determined.

When the host function and the peripheral function are used concurrently, one USB port 24b is used by the peripheral controller 29 and the remaining two USB ports 24a are used by the host controller 25, for example. In summary, when the peripheral function and the host function are commonly used in one USB device, the peripheral controller 29 and the host controller 25 share the RAM 28. Accordingly, a part of the RAM 28 functions as the region for peripheral 28b, and the remaining part functions as the region for host 28a. The region for peripheral 28b is preferentially secured and the remaining part is the region for host 28a. Accordingly, even when the allocation of the pipe region is changed, there is no change in the region for peripheral 28b. In summary, the link destination address is invalid in the blocks corresponding to the region for peripheral 28b.

As stated above, at least a part of the RAM 28 can be used for both of the region for peripheral 28b and the region for host 28a. In other words, the blocks 0 to 4 are one of the region for peripheral 28b and the region for host 28a according to the setting in the register 27. The region used for one of them is secured in the RAM 28, and set to any one of the region for host 28a and the region for peripheral 28b according to the setting of the register 27.

Next, with reference to FIG. 4, a case in which the whole RAM 28 is allocated to the peripheral function will be described. In FIG. 4, the blocks 0 to 11 are allocated to the peripheral function. In summary, all the blocks are the region for peripheral 28b. In the blocks 0 to 11 included in the region for peripheral 28b, all the link destination block numbers are Invalid. In this case, there is no change in the link destination block number.

Figure 5:
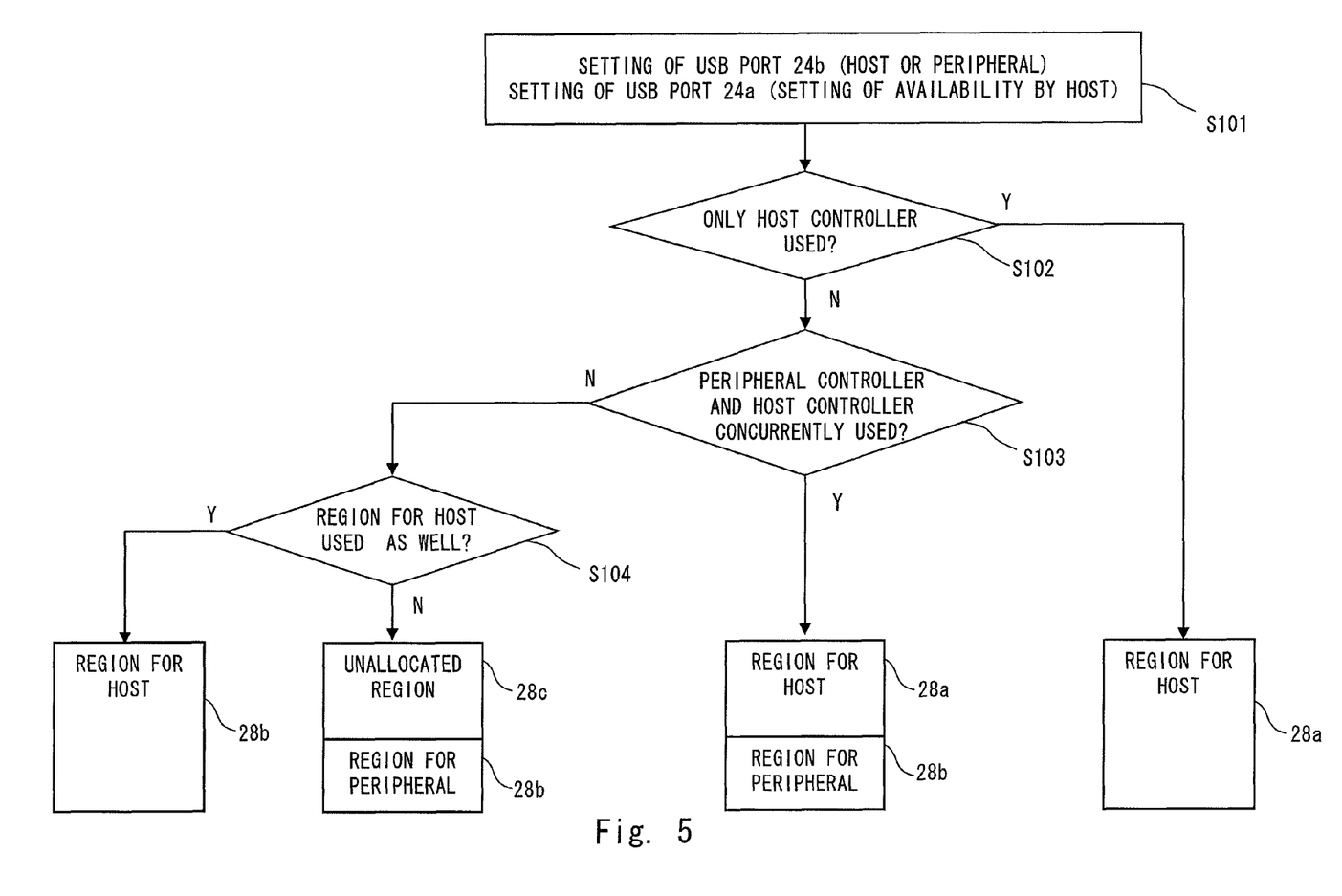
FIG. 5 is a flow chart showing a buffer memory control method according to the exemplary embodiment of the present invention.

Next, a control method of the buffer memory according to the exemplary embodiment of the present invention will be described with reference to FIG. 5. FIG. 5 is a flow chart showing a buffer memory control method according to the exemplary embodiment of the present invention.

First, the controller using the USB port 24b is set (step S101). More specifically, it is set whether the host controller 25 uses the USB port 24b or the peripheral controller 29 uses the USB port 24b. To be more specific, one of the three USB ports 24 is the USB port 24b that can be used by one of the host controller 25 and the peripheral controller 29, and the other two USB ports 24a are used only by the host controller 25. Then, it is set whether the USB port 24b is used by the host controller 25 or by the peripheral controller 29. Further, it is set whether or not the host controller 25 uses the USB port 24a.

It is determined whether the USB port 24b is used as host or peripheral by setting the register 27. Furthermore, it is determined whether or not the host controller 25 uses the USB port 24a by setting the register 27. In this example, the setting is made according to the USB device to which the USB controller 12 is incorporated. This setting is changed by a user of the USB controller 12. The set value is written into the register 27 and the register 30 in the user side of the USB controller 12. Once the setting is performed, the allocation of the region of the RAM 28 is fixed. According to this setting, the determination will be made in the following steps. Further, the setting for the register 30 may be performed at this step. Each of the register 27 and the register 30 may be formed of a plurality of registers.

Next, it is determined whether or not the host controller 25 uses the USB port 24b by referring to the register 27 (step S102). When the host controller 25 uses the USB port 24b (Y in step S102), all the blocks of the RAM 28 are the region for host 28a. In other words, the state is as shown in FIG. 2.

When the controller using the USB port 24b is not the host controller 25 (N in step S102), in other words, when the peripheral controller 29 uses the USB port 24b, it is determined whether the peripheral controller 29 and the host controller 25 are concurrently used (step S103). In summary, it is determined whether or not the host controller 25 uses the USB port 24a. It is determined whether both of the peripheral controller 29 and the host controller 25 are used by referring to the register 27.

When the USB device uses both of the peripheral controller 29 and the host controller 25 (Y in step S103), the region for host 28a and the region for peripheral 28b are allocated in the RAM 28. Accordingly, the state is as shown in FIG. 3. For example, a printer, which is the combination device, shows such a setting. In this case, the host controller 25 uses the USB port 24a, and the peripheral controller 29 uses the USB port 24b.

When the USB controller 12 is incorporated in the combination device, the memory size allocated to the region for peripheral 28b is predetermined. In other words, the memory size allocated to the region for peripheral 28b is determined as the standard of the USB controller 12 by a manufacturer of the USB controller 12. For example, when the memory size of the RAM 28 is 1 kByte, 0.2 kByte of the 1 kByte is allocated to the region for peripheral 28b. Needless to say, the memory size of the region for peripheral 28b is not specifically limited. Note that the memory size allocated to the region for peripheral 28b may be set by a user of the USB controller 12. For example, when setting is made in step S101, the block number of the block allocated to the region for peripheral 28b is designated. In summary, the user of the USB controller 12 is able to optimize the memory size allocated to the region for peripheral 28b according to the USB device.

Next, when the determination in step S103 is N, in other words, a case in which the peripheral controller 29 and the host controller 25 are not concurrently used, will be described. In this case, the USB controller 12 is incorporated in the USB peripheral device. Thus, only the USB port 24b is used, and the USB port 24a is not used. Then, it is determined whether the peripheral controller 29 also uses the region for host 28a by referring to the register 30 (step S104). When the peripheral controller 29 does not use the region for host 28a, the block which would have been the region for host 28a becomes the unallocated region 28c. As such, the region that is not used as the region for host 28a becomes the unallocated region.

On the other hand, when the peripheral controller 29 also uses the region for host 28a, the block allocated to the region for host 28a is used as the region for peripheral 28b. Accordingly, all the blocks are used as the region for peripheral 28b, and this state is shown in FIG. 4. For example, the USB memory or the like which is the USB peripheral device may be set like this. As such, the blocks which would have become the unallocated region 28c can be used as the region for peripheral 28b. Accordingly, the buffer memory can be used with high efficiency, and further USB peripheral functions can be added.

In this exemplary embodiment, it is determined whether the region for host 28a is used as the region for peripheral 28b according to the setting of the register 30. For example, when the register 30 is 1, the region which is the region for host 28a is used as the region for peripheral 28b, and accordingly, the whole region of the RAM 28 is used as the region for peripheral 28b. Further, when the register 30 is 0, a part of the RAM 28 is used as the region for peripheral 28b, and the remaining part is the unallocated region 28c. As such, it is set in the register 30 whether the region for host 28a is used as the region for peripheral 28b.

As stated above, the USB is applied to various types of devices. Accordingly, the allocation of the RAM 28 which is the buffer memory varies according to the USB device in which the USB controller 12 is incorporated. Further, in a case of the combination device, the region for peripheral 28b is preferentially secured. Then, the remaining region is allocated to the region for host 28a. Accordingly, even when the pipe region is added or opened in the region for host 28a, the address can be managed without paying attention to the peripheral region. Then, by managing the region for host as the chain by the buffer controller 26, even when the allocated region of the buffer becomes partial due to the addition or opening of the pipe region, the remaining region can be effectively used. Further, the load for managing the buffer by the user using the USB controller can be reduced.

Further, there is no need to design or manufacture the integrated circuit according to the USB device 10. In other words, even when the USB controller 12 having the same configuration is incorporated in different USB devices 10, the buffer memory can be used with high efficiency. Accordingly, the available range of the USB controller 12 can be made wider, and the generality can be improved. Further, there is no need to separately provide the buffer memory for each of the host controller 25 and the peripheral controller 29.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A USB (Universal Serial Bus) controller incorporated in a USB device, the USB controller comprising:
   a buffer memory that stores data transferred through a USB port or a CPU bus said buffer memory divided into a first region used when the USB device is used for a peripheral function and a second region used when the USB device is used for a host function, thereby permitting the USB device to function as a combination device; and
   a holding part that holds a setting for designating the first region of the buffer memory used for the peripheral function and the second region used for the host function,
   wherein a first part of the buffer memory is allocated to the first region for peripheral function and a rest of the buffer memory is allocated to the second region for host function when the USB controller is incorporated in a USB device that is a combination device able to concurrently use the host function and the peripheral function.

2. The USB controller according to claim 1, wherein memory size of the first region for peripheral function allocated by the setting held in the holding part is variable.

3. The USB controller according to claim 1, wherein the buffer memory is divided into a plurality of blocks, and the buffer memory is managed by a chain management using a block number attached to each of the blocks.

4. The USB controller according to claim 3, wherein a link destination block in the chain management is set according to the block number in the block allocated to the region for host; and a link destination block in the chain management is set to invalid in the block allocated to the region for peripheral.

5. A buffer memory control method controlling a buffer memory provided in a USB (Universal Serial Bus) controller incorporated in a USB device, the method comprising:
   holding a setting for designating a first region of the buffer memory to be used for a peripheral function and a second region to be used for a host function thereby permitting the USB device to function as a combination device; and
   allocating a part of the buffer memory to a first region for use by the USB device when functioning as a peripheral and a part to a second region for use by the USB device when functioning as a host according to the setting,
   wherein a first part of the buffer memory is allocated to the first region for peripheral function and a rest of the buffer memory is allocated to the second region for host function when the USB device is able to concurrently use the host function and the peripheral function.

6. The buffer memory control method according to claim 5, comprising determining a memory size of the first region for peripheral function to be allocated when the setting is held.

7. The buffer memory control method according to claim 5, wherein the buffer memory is divided into a plurality of blocks, and the buffer memory is managed as a chain using a block number attached to each of the blocks.

8. The buffer memory control method according to claim 7, wherein a link destination block in the chain management is set according to the block number in the block allocated to the region for host; and a link destination block in the chain management is set to invalid in the block allocated to the region for peripheral.

9. The buffer memory control method according to claim 5, wherein the holding of a setting a made at the time of manufacturing the USB device.

10. The buffer memory control method according to claim 5, wherein the setting of the holding part is set according to a type of the USB device.

* * * * *